Sept. 5, 1944.  E. F. FLINT  2,357,390
OPTICAL INSTRUMENT
Filed Jan. 23, 1943

EDWARD F. FLINT
INVENTOR
BY
ATTORNEYS

Patented Sept. 5, 1944

2,357,390

UNITED STATES PATENT OFFICE 2,357,390

OPTICAL INSTRUMENT

Edward F. Flint, Rochester, N. Y., assignor to Bausch & Lomb Optical Company, Rochester, N. Y., a corporation of New York Application January 23, 1943, Serial No. 473,331

5 Claims. (Cl. 88—2.7)

This invention relates to optical instruments and more particularly to an instrument for celestial navigation.

The instrument of the present invention is particularly adapted for measuring the angular elevation of certain celestial bodies which measurements can be used by a navigator or an observer to determine his position on the earth's surface. The instrument has been illustrated as an octant although it will be apparent from the following description that the instrument may take forms other than an octant.

Instruments such as octants have come into wide use since the advent of aircraft capable of long-distance flights. Under many flying conditions, it is the only instrument by which the navigator or observer can determine his position relative to the earth's surface. Octants and similar instruments, particularly adapted for use with aircraft, are generally provided with a liquid bubble level which is employed as an artificial horizon, but it is desirable in some observations to use the natural horizon. In many of the instruments heretofore proposed, means have been provided whereby the natural horizon when desired could be viewed and the celestial body observed correlated with the horizon rather than with the datum plane formed by the bubble level. This means in most instruments heretofore used has either comprised a prism which could be moved into the optical path of the instrument or a prism fixed on the instrument and occluded by a suitable shutter when not in use.

In both classes of instruments, the real horizon prism occluded a portion of the celestial field and therefore actually reduced the size of the same. The size of the horizon field was correspondingly reduced and thus it was difficult in these instruments to hold the image of the celestial body in the reduced field and in accurate alignment with the horizon as viewed in the reduced horizon field.

In the instrument of the present invention this difficulty has been completely obviated, for the image of the observed body can be made to coincide with the image of the real horizon as the two images are viewed in superimposed relationship. This is possible due to the means for introducing the image of the natural horizon into the optical path of the instrument. This means preferably comprises a filter which is slidably mounted on the instrument and movable into the optical path of the same intermediate the index reflector and objective of the instrument. The filter is disposed in the optical path of the instrument in such a way that the first surface thereof reflects light rays from the horizon while the rays from the observed body reflected by the index reflector pass through the filter. Thus the intensity of the rays from the natural horizon reflected by the reflecting surface of the filter is not changed to the extent that the intensity of the rays from the celestial body is changed, as the latter rays pass through the filter and are partially absorbed thereby.

Other objects and advantages of the present invention will appear in the following description taken in connection with the accompanying drawing in which.

Figure 1:
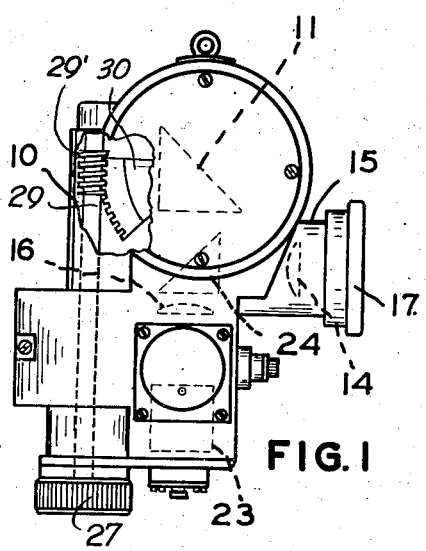
Fig. 1 is an elevational view of the instrument of the present invention, showing a portion of the optical system thereof in broken lines.
Figure 2:
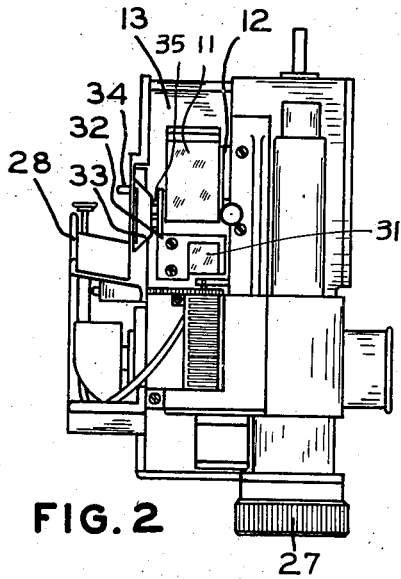
Fig. 2 is a front view in elevation of the instrument of the present invention.
Figure 3:
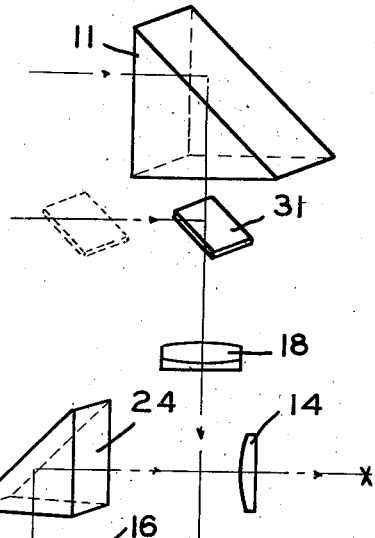
Fig. 3 is a schematic view of the optical system of the present invention.

The instrument of the present invention, referring now to the drawings, comprises a casing 10 housing the optical system, a part of which is shown in broken lines in Fig. 1, and the operating mechanism of the instrument.

The optical system in the now-preferred form comprises an index prism 11 mounted in a carrier 12, pivotally mounted in a recess 13 formed in the front face of the casing 10. The eyepiece of the optical system comprises an eye lens 14 carried by an ocular tube 15 projecting from the casing 10 and a collective lens 16 mounted within the casing. The ocular tube 15 carries the usual eye guard 17 and may include a pair of telescopic sections relatively adjustable to permit the eyepiece to be focused by the user.

To render celestial bodies of small magnitude visible and to increase the sharpness of the image of the body observed, it is preferred to form the eye lens and collective lens so that there is some telescopic power. Any power desired can be obtained by varying the equivalent focal length of the eyepiece relative to the equivalent focal length of the objective 18. The power of the system is preferably one which will bring out a crisp image of the body observed but should not be so high as to make the instrument difficult to hold on the body.

The objective 18 in the form now preferred is achromatic and has an equivalent focal length equal to the radius of the bubble lens curve 19 of the bubble cell 21 and the center of curvature of the bubble lens curve lies in the principal plane of the objective 18. Thus the bubble 22 is not superimposed on the focal plane of the objective 18 but is actually viewed in that plane and movement of the bubble 22 is constrained to an arc coincident with the focal plane of the objective.

As the bubble lens curve lies in the focal plane of the objective, the images of the celestial body observed and the bubble will move at the same speed but as the images formed by the eyepiece and objective are reversed as well as inverted, the images will move in opposite directions.

To reverse and invert the image formed by the eyepiece and objective, a reversing prism 23 is mounted within the casing 10 in such a manner that the exit ray of the prism is reversed and displaced laterally from the entrance ray of the same. Thus the image is reversed and the optical path is bent back so that the system can be mounted within a smaller casing than would be possible with the optical path lying in one plane.

Any means desired may be used to invert the image, although in the form of the invention now preferred, a prism 24 is placed between the collective 16 and the eye lens 14 and cooperates with the index prism 11 to turn the image inverted by the eyepiece and objective 180° about the horizontal axis of the same. Accordingly, the images formed by the optical system of the instrument of the present invention are normal, that is, erect and normal right to left.

Due to the particular disposition of the bubble cell 21 in the optical system, and as the images formed by the same are normal, the observed image of the bubble will move at the same rate of speed and in the same direction as the image of the celestial body observed and coincidence can be made anywhere in the vertical measurement plane of the bubble field. This simplifies the use of the instrument, particularly in a yawing aircraft subject to phugoid oscillations.

The position of the index prism 11 is adjusted to bring the image of the observed body into coincidence with the image of the bubble 22 by an operating knob 27. The knob 27 is mounted on the underside of the instrument and in the use of the instrument is actuated by the left hand as the handle 28 of the instrument is grasped by the right.

The operating mechanism of the instrument forms no part of the present invention as it is fully described and claimed in my prior application, Serial No. 462,379, filed October 17, 1942. For the purpose of describing the operation of the instrument of the present invention, it is believed sufficient to say that the index prism 11 may be adjusted by rotation of the knob 27 as the latter is fixed to the lower end of a shaft 29 carrying at the upper end thereof a worm 29' which engages a gear sector 30 fixed to the carrier 12.

In some conditions of flight and use of the instrument, it is desirable to use the real horizon as the datum plane. To permit the real horizon to be used as the datum plane, a reflector 31 is mounted in the recess 13 for movement into the optical path of the instrument for reflecting into the same an image of the horizon. The reflector 31 is fixed to a carrier 32 adjustably connected to a slide 33 operating in a groove formed in the face of one wall of the recess 13 and actuated by a knob 34 projecting through the wall of the casing 10 and operating in a slot, not shown, formed in the wall of the casing.

The position of the reflector 31 may be adjusted relative to the carrier 32 by means of a plurality of screws 35 interconnecting the carrier to the slide 33. This permits less accurate machine operation when the screws and slide are formed and therefore lessens the cost of the instrument.

As the reflector 31 is actually moved into the optical path of the instrument intermediate the objective 18 and the index prism 11, it must be formed of a material which will transmit light and in the form of the invention now preferred, the reflector is formed of some suitably colored glass or similar material. It will be seen, referring now to Fig. 4, that the front surface of the reflector 31 as it is uniplanar will reflect at least a portion of the rays from the real horizon, and in the drawing, the ray 36 may be taken as representing the central ray of a bundle of rays from the natural horizon. This ray as clearly shown in Fig. 4 is partially reflected downward while the remainder will pass through the body 31.

Figure 4:
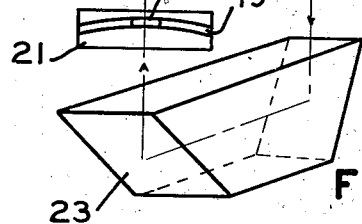
Fig. 4 is a schematic view of the index prism and natural horizon reflector, showing the optical path of the rays from the observed body and natural horizon.

The central ray of the bundle of rays from the celestial body observed, indicated in Fig. 4 at 37, after being reflected by the index prism 11 will pass through the reflector 31 to the end that the intensity thereof will be considerably reduced.

The reflector 31, when disposed in the optical path of the instrument, is so positioned relative to the index reflector 11 that the path of the rays reflected by the front surface thereof will coincide with the path of the rays transmitted thereby.

It will be obvious now that the images of the real horizon and the celestial body observed will be superimposed and the observer will be able by suitable manipulation of the operating knob 27, to cause the image of the observed body to coincide with the image of the natural horizon. This eliminates the possibility of error inherent in the previous instruments having a split field in which the image of the natural horizon was in a field laterally displaced from the field in which the image of the observed body was formed.

Due to the position in the optical path which the filter 31 occupies when the same is moved therein, there is no need to compensate for its effect in the optical path, as the light rays are parallel in this portion of the path and the focal point of the objective is not affected by the filter 31.

It is obvious that a number of filter-reflectors, such as 31, could be used of different densities and severally or jointly movable into the optical path of the instrument for observing celestial bodies of different brightness such as the sun and moon, or for observing the sun under different sky and cloud conditions.

While several embodiments of the present invention have been disclosed, it is to be understood that the invention need not be limited to the embodiment shown and described but is susceptible of modification falling within the spirit of the invention and the scope of the appended claims.

I claim:

1. A sextant or the like comprising a casing; an objective mounted within said casing; an index reflector for reflecting light rays from celestial bodies to said objective; and a transparent plate of light absorbing material carried by said casing intermediate the index reflector and objective and in the path of light rays reflected by said index reflector, said plate having a reflecting face for reflecting light rays from the real horizon into said objective whereby said objective forms superimposed images of the horizon and the celestial body observed.

2. A sextant or the like comprising a casing; an objective mounted within said casing; an index reflector for reflecting light rays from celestial bodies to said objective; a transparent plate of light absorbing material; means for mounting said plate for movement between alternate positions on said casing, said plate in one of said alternate positions being disposed intermediate the index reflector and objective and in the path of light rays reflected by said index reflector; and a reflecting face on said plate adapted when said plate is moved to the position intermediate the index reflector and objective to reflect light rays from the real horizon into said objective, whereby said objective forms superimposed images of the horizon and the celestial body observed.

3. A sextant or the like comprising a casing; an objective mounted within said casing; an index reflector for reflecting light rays from celestial bodies to said objective; a plate of colored glass carried by said casing and having a polished front surface adapted to reflect light rays from the natural horizon to said objective, said plate being disposed in the path of light rays reflected by said index reflector and absorbing at least a part of the rays from the celestial body observed; and eyepiece means for viewing the superimposed images formed by said objective.

4. A sextant or the like comprising an objective; an index reflector mounted above said objective and adapted to direct light rays from celestial bodies to said objective; a filter obliquely mounted between said index reflector and said objective for absorbing at least part of the light rays reflected by said index reflector, the front surface of said reflector being such that light rays from the natural horizon incident thereon are reflected to said objective in a path substantially coincident with the path of the rays transmitted by said filter; and an eyepiece for viewing the superimposed images formed by the objective of the natural horizon and the celestial body observed.

5. A sextant or the like comprising a casing; an index reflector for establishing an angularly adjustable line of sight in a vertical plane of measure; an objective disposed in optical alignment with said reflector and forming images of celestial bodies in said vertical plane when light rays from said bodies are directed thereto by said reflector; a transparent plate of light absorbing material carried by said casing intermediate the index reflector and objective, said plate having a reflecting face for reflecting light rays from the portion of the real horizon intersecting said vertical plane into said objective whereby said objective forms superimposed images of the horizon and the celestial body observed; and eyepiece means for viewing the superimposed images formed by said objective.

EDWARD F. FLINT.